May 14, 1963 J. J. EVERARD ET AL 3,089,926
ELECTRIC SWITCHES AND SYSTEMS CONTROLLED THEREBY
Filed Sept. 21, 1959 3 Sheets-Sheet 1
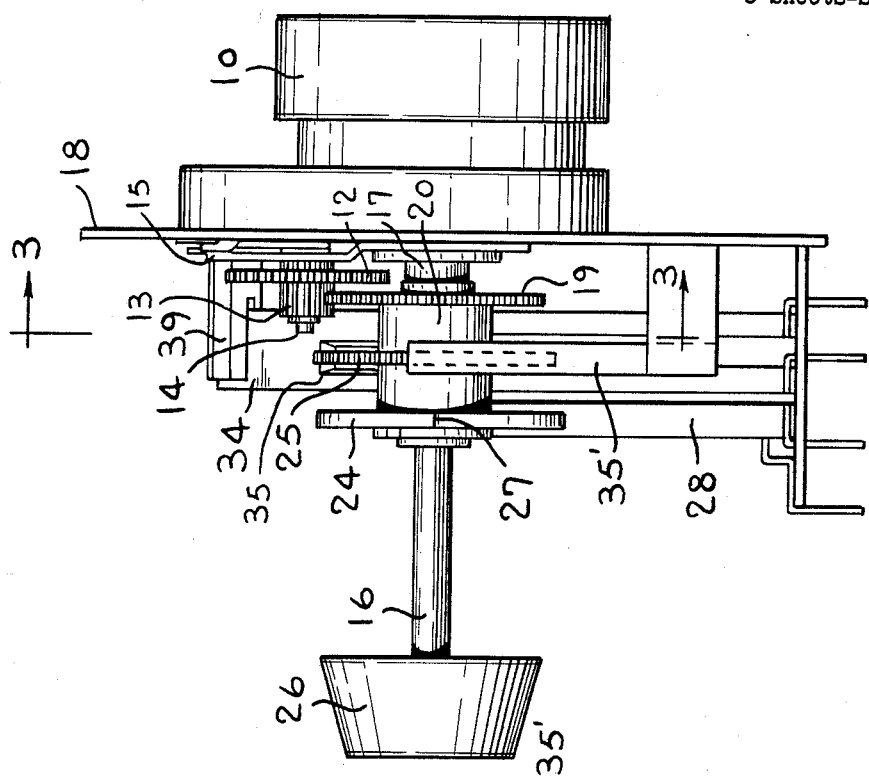
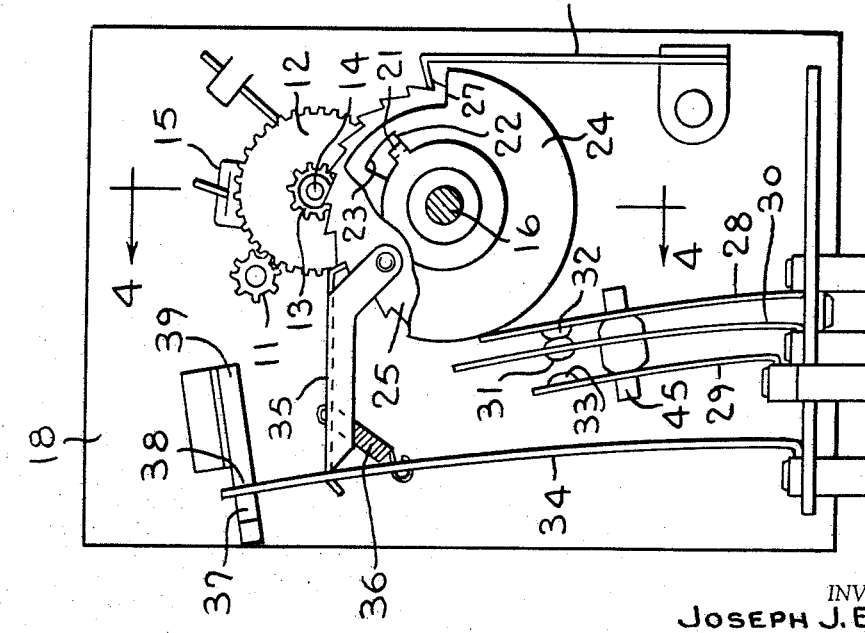
INVENTORS
JOSEPH J. EVERARD
ROGER D. RULSEH
BY
*Arthur R. Woolfolk*
ATTORNEY INVENTORS
JOSEPH J. EVERARD
ROGER D. RULSEH
BY
Arthur R. Woolfolk
ATTORNEY May 14, 1963   J. J. EVERARD ET AL   3,089,926
ELECTRIC SWITCHES AND SYSTEMS CONTROLLED THEREBY
Filed Sept. 21, 1959   3 Sheets-Sheet 3

INVENTORS
JOSEPH J. EVERARD
ROGER D. RULSEH
BY
Arthur R. Woolfolk
ATTORNEY

United States Patent Office 3,089,926
Patented May 14, 1963

3,089,926
ELECTRIC SWITCHES AND SYSTEMS
CONTROLLED THEREBY
Joseph J. Everard, Manitowoc, and Roger D. Rulseh,
Two Rivers, Wis., assignors, by mesne assignments, to
American Machine & Foundry Company, New York,
N.Y., a corporation of New Jersey
Filed Sept. 21, 1959, Ser. No. 841,118
2 Claims. (Cl. 200—38)

This invention relates to electric switches.

This invention is an improvement over that disclosed in the copending application of Paul W. Timm and Roger D. Rulseh, Serial No. 783,398, now Patent No. 2,984,716, filed December 29, 1958, for Electric Switches, and is also an improvement over the application of Joseph J. Everard, Serial No. 613,186, now Patent No. 2,975,612, filed October 1, 1956, for Control Means for Defrosting Refrigerators, both of said copending applications being assigned to the same assignee as the present application.

While the invention is applicable to a number of different systems, it nevertheless is particularly adapted to the defrosting of a refrigerator, or to the control of air conditioning means, or cooling means, or electric signs or other systems, only a few of which are mentioned, wherein two different circuits are employed, and wherein these circuits are controlled in such a manner as to permit energization of either circuit as desired.

A specific object of this invention is to provide cam means driven by a synchronous motor and to have the cam means provided with a suitable contour so that the compressor motor circuit would be opened at a predetermined time and the heater element substituted to thereby cause rapid defrosting and to have the system so arranged that the high temperature thermostat will operate to control a bimetal or other thermal element and to have the thermal element arranged to advance the ratchet dog or similar member to a position ready to engage a ratchet wheel or other member, and to have the bimetal element arranged to cause a ratchet dog to engage a tooth or other portion of a ratchet or similar wheel so that on cooling it will advance the cam means and restore the parts of a multiple switch to their initial position thereby putting the compressor motor in circuit and cutting the heater means out, lost motion mechanism being provided to allow such operation without disturbing the initial relative setting of the timing motor and the cam means.

A further specific object of this invention is to provide a construction in which the defrosting operation, when the device is applied to a refrigerator, is time initiated and temperature terminated, and in which a timing motor is employed for driving a cam means thereby causing defrosting to occur at a predetermined or preselected time and thereafter allowing a multiple contact switch to be restored to its initial position by the cooling of the thermal member or bimetal member, such member being arranged to advance the cam to the desired position to restore the switch to its initial position.

Embodiments of the invention are shown in the accompanying drawings in which:

The electric switches are shown as used in the defrosting system for electric refrigerators, but it is to be understood that this showing is illustrative and in no way limiting other than as claimed.

FIGURE 1 is a front view of the switch with the cover removed.

FIGURE 2 is a side view of the switch.

This invention has been shown as applied to an electric refrigerator, but it is to be understood that the multiple switch of this invention can be used in a number of different places not only for the control of an electric refrigerator but for the control of any system whatsoever where two circuits are alternately controlled so that the first circuit normally is closed, so far as the multiple switch is concerned, and the second circuit is open, and in which the switch is so arranged that it can quickly shift so that the second circuit is completed and the first circuit opened. Therefore it is to be understood that though the description and drawings are primarily directed to the association of the electric switch with an electric refrigerator it nevertheless may be used in a number of different capacities.

Figure 3:
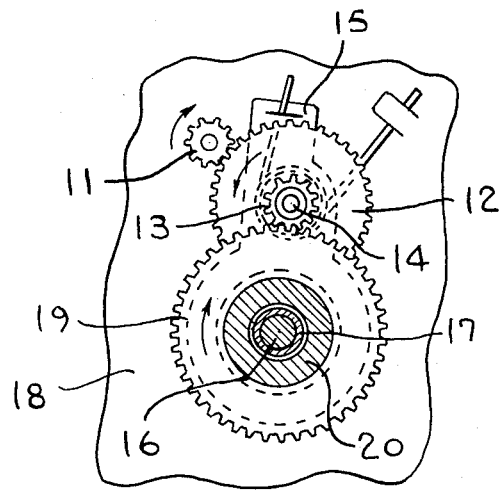
FIGURE 3 is a fragmentary sectional view on the line 3—3 of FIGURE 2.
Figure 4:
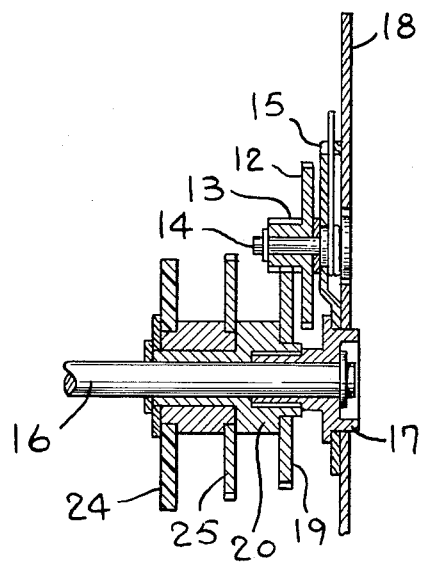
FIGURE 4 is a fragmentary sectional view on the line 4—4 of FIGURE 1.

Referring to the drawings, particularly FIGURES 1 to 8, showing the first form of the invention, it will be seen that a timing motor 10 is provided which, through reduction gearing, drives the pinion 11, see FIGURE 1. The pinion 11 drives a gear 12 which is rigid with a small pinion 13, the gear 12 and the pinion 13 being revolubly mounted on a pin 14 carried by a lever 15. The lever 15, it will be seen, particularly from FIGURE 4, is mounted coaxially with a manually adjustable shaft 16. The shaft 16 is revolubly mounted in an elongated supporting hub-like member 17 rigid with the back plate 18. The shaft 16 is rigid with a gear 19 which is driven from the motor driven pinion 13. The shaft 16 is also rigid with the revolubly mounted hub 20.

The hub 20 carries a projecting finger 21 which normally bears against the leading edge 22 of a cut-out portion or notch 23 in the cam 24. The cam 24 is rigid with a ratchet wheel 25.

It will be seen, therefore, that the timing motor 10 drives the pinion 11 which drives the cam 24 and ratchet wheel 25 through the finger 21 and the leading edge 22 of the cut-out 23. If it is desired to manually set the finger 21, and consequently, set the cam, this can readily be done by means of the hand wheel 26, see FIGURE 2, which hand wheel is rigid with the shaft 16. In this way the initial setting of the finger 21 is obtained.

Figure 5:
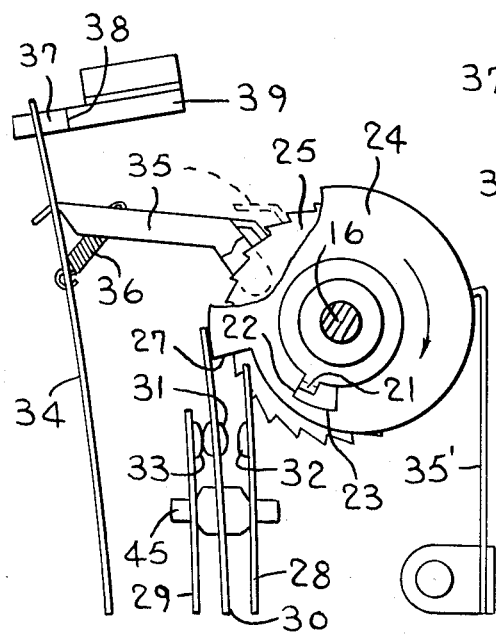
FIGURE 5 is a fragmentary view of the switch showing the position in which the power element is separated from the motor element of the switch and thereby showing the condition of the switch when the compressor motor circuit has been opened by the switch.
Figure 6:
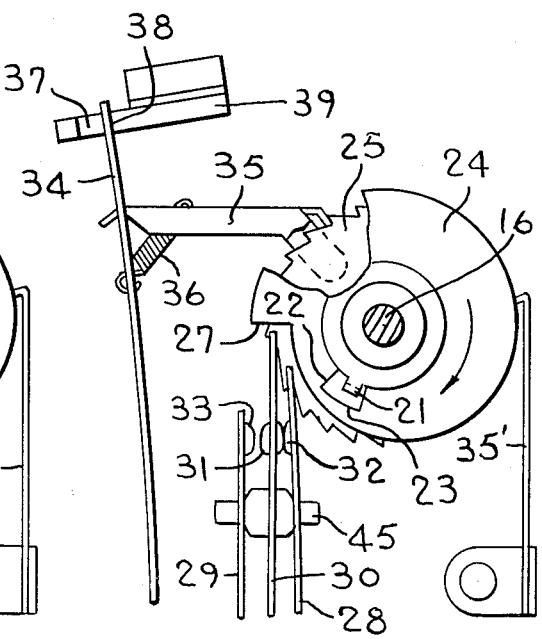
FIGURE 6 is a view similar to FIGURE 5 showing the position of the parts when the switch has been returned to its initial position after passing the shoulder on the cam.

The cam 24 is provided with a shoulder 27, see FIGURES 1, 5 and 6.

A resilient compressor motor contact blade 28 and a resilient heater contact blade 29 are rigidly carried at their lower ends as may be seen from FIGURE 1, and both of them are biased towards the right as viewed in FIGURES 1, 5 and 6.

Between the compressor motor contact blade 28 and the heater contact blade 29, a power contact blade 30 is mounted, and is also biased toward the right. Normally this power contact blade 30 has its contact 31 in engagement with the contact 32 of the compressor motor contact blade 28, and out of contact with a contact 33 of the heater contact blade 29 as shown in FIGURES 1 and 6.

Figure 8:
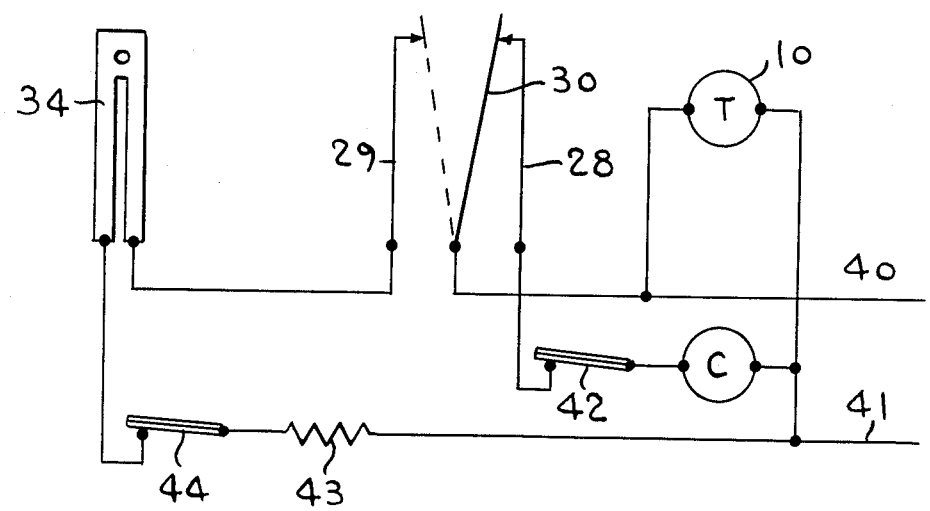
FIGURE 8 is a wiring diagram.

The compressor motor is indicated at C in the wiring diagram of FIGURE 8. The timing synchronous motor is indicated at T and also is numbered 10 in such figure.

It is to be noted that the combination of the driving pinion 11, the gear 12, and its pinion 13, and the gear 19 constitute an overrunning clutch for when the gear 19 and the finger 21 are moved manually, the lever 15 is moved to the right as viewed in FIGURE 3, and thus disconnects the gearing between the synchronous motor driven pinion 11 and the driven gear 19. This overrunning clutch is of well known construction.

The finger 21 and notch or cut-out 23 with its leading edge 22 constitute a lost motion mechanism, which is interposed between drive pinion 11 and cam 24.

A bimetal member or thermal member 34 is rigidly supported at its lower end as viewed in FIGURE 1 and is provided with a ratchet finger or pawl 35 spring pressed in a clockwise direction by means of the spring 36, see FIGURE 1. The spring 36 also holds the dog or pawl 35 in position on the bimetal or thermal member 34.

The upper end of the bimetal member 34 is free to move within the notch or cut-out portion 37 of an insulating member 38, and normally rests against the forward face or right-hand face of the notch 37, such forward face being indicated at 38 in FIGURES 5 and 6.

When the bimetal member 34 is cool it occupies the position shown in FIGURE 6, and when heated it moves to the left and occupies the position shown in FIGURE 5. A resilient locking pawl 35' prevents reverse rotation of the ratchet wheel.

The ratchet wheel 25, as has been stated, is rigid with the cam 24 so that when the ratchet member is moved in a clockwise direction the cam 24 is similarly moved or rotated in a clockwise direction.

Attention is directed to the wiring diagram FIGURE 8.

It will be noted that the power mains FIGURE 8 are indicated by the reference characters 40 and 41. They are permanently connected to the timing motor T as shown, and are connected to the compressor motor through a low temperature thermostat 42 and the compressor motor contact arm 28. This thermostat 42 opens when cold when the temperature drops to a predetermined cold point level and thus stops the compressor motor by opening its circuit.

A heater element is indicated by the reference character 43 and is connected through a high temperature thermostat 44 which opens when the thermostat within the refrigerator rises to a predetermined high level during defrosting.

It is to be noted that the contact blade or heater contact blade 29 is connected through the bimetal member 34 to the heater 43 through the high temperature thermostat 44 and from there it is connected to the main 41.

Normally the parts of the switch occupy the position shown in FIGURE 8.

The operation of the first form of the invention is as follows:

Assume that the compressor motor C is in operation and the refrigerating system is operating. When the temperature has dropped to the lowest point desired the thermostat 42 opens. During this period the timing motor T continuously drives the mechanism.

When the temperature in the refirgerator rises above the predetermined desired point, the thermostat 42 closes and the compressor motor starts again. However, the timing motor runs continuously without interruption and consequently at a certain selected time the first contact arm, or in other words the contact arm 28 or compressor motor contact arm drops off of the cam at the shoulder 27 as shown in FIGURE 5, while the power contact blade 30 is still held by the cam.

An insulating member 45, see FIGURES 5 and 6, extends loosely through the power contact blade or arm 30 so that the compressor motor arm or contact blade 28 and the outer or heater blade or contact arm 29 move in unison. The result of this is that as long as the power contact blade 30 is held at the shoulder of the cam, contact is made between its contact 31 and the contact 33 of the heater arm 29. Current now passes from the mains through the heater 43 and through the high temperature thermostat 44, which latter is in series with the heater 43 as will be seen in the wiring diagram, FIGURE 8.

During this period the bimetal element or thermal element or member 34 is heated, and consequently moves to the left as viewed in FIGURES 5 and 6, and moves its ratchet member or pawl 35 to the left and engages the appropriate notch of the ratchet wheel 25. The ratchet wheel is held against counter-clockwise motion during this period by means of the pawl or locking lever 35', FIGURES 5 and 6, which engages one of the ratchet teeth and holds the ratchet wheel against reverse rotation.

When the thermal element 34 or bimetal element cools upon opening of the high temperature thermostat, it moves to the right causing pawl 35 to drive the ratchet wheel and its rigidly attached cam 24 in a clockwise direction to the position shown in FIGURE 6. Due to the disengaging action of the lost motion coupling interposed between cam 24 and pinion 11, thermal element 34 advances cam 24, independent of driving finger 21, powered by synchronous motor 10. That is, cam 24 freely travels a limited distance as defined by the travel of finger 21 within slot 23, when urged clockwise by thermal element 34. The result of this is that the power arm 30 drops off of the shoulder 27 and thereby moves its contact 31 out of engagement with the contact 33 of the heater blade 29, and cuts the current off the heater element 43.

When this occurs, as stated hereinabove, the parts move to their initial position shown in FIGURE 6.

It will be seen that no matter how quickly the bimetal member 34 moves when it is heated, it cools gradually, and no shock is imposed on the mechanism associated therewith. Instead the ratchet wheel 25 and the cam 24 are moved at a predetermined rate to the position shown in FIGURE 6, where they remain stationary until finger 21, continuously driven by synchronous motor 10, again engages edge 22 and re-commences the movement of cam 24.

It will be seen that the switch is time controlled for the initiation of its operation, and temperature controlled for its return to its initial position.

Figures 9, 10, 11, 12:
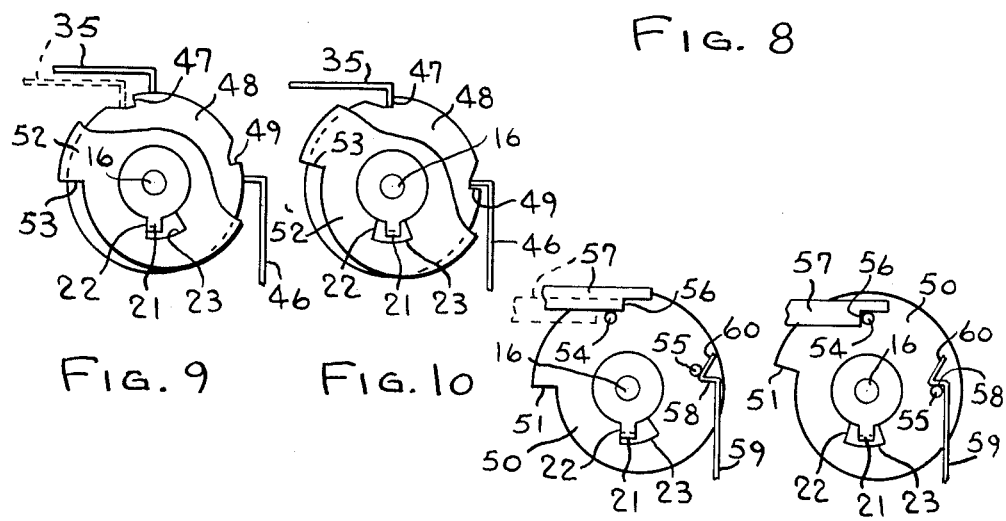
FIGURES 9 and 10 show a modification of the switch, such figures corresponding respectively to FIGURES 5 and 6 for the first form of the switch.
FIGURES 11 and 12 show a further modification of the switch corresponding respectively to FIGURES 5 and 6.
Figure 7:
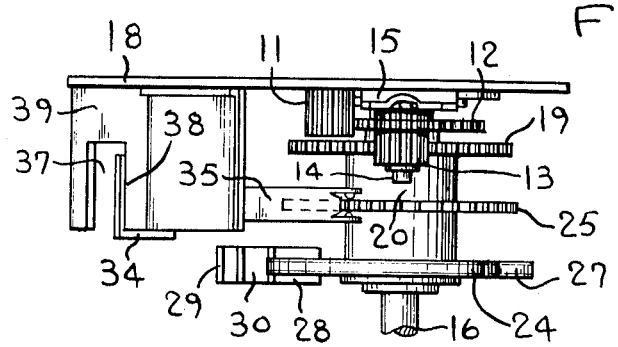
FIGURE 7 is a top view of the switch.

The ratchet wheel 25 need not be provided with teeth all the way around, but in the first modified form, as shown in FIGURES 9 and 10, a single shoulder indicated at 47 on the ratchet wheel 48, see FIGURES 9 and 10, is all that is needed so far as the operation of the bimetal member and its pawl 35 are concerned.

Also it is apparent that the locking member or arm 46, and a single notch or shouldered portion 49 is all that is needed.

Further than this, the ratchet wheel may be as shown in FIGURES 11 and 12 in the further form that the invention might take. In this form the cam is indicated by the reference character 50, and is provided with the shouldered portion or notch 51. All of the cams of course are provided with a shouldered or notched portion corresponding to that indicated at 27 in FIGURES 5 and 6 for the first form of the invention. The corresponding shouldered portion on the cam 52 of FIGURES 9 and 10 is indicated by the reference character 53.

It is to be noted that the hub 20 is provided with the rigidly attached driving finger 21 previously described and that this driving finger 21 in all of the different forms is located within the notched or cut-out portion 23 of the cam. Normally it engages the leading edge 22 in each form of the invention. This provides the lost motion construction in each form of the invention, and the same reference characters are used for these portions in each of the several disclosures.

The purpose of this is to allow the cam to move away from the driving finger 21 as previously described.

In the form of the invention shown in FIGURES 11 and 12 the cam 50 is provided with a pair of pins 54 and 55. The pin 54 is adapted to be engaged by the shoulder 56 of the pawl 57 of the bimetal element 34, previously described. The pin 55 is arranged to be engaged by the shoulder 58, as shown in FIGURE 12, of a locking pawl or blade 59, after passing down the slanting portion 60.

It will be seen that a very simple type of switch has been provided in which the initiation of the heating period and opening of the compressor motor circuit is time controlled and in which the termination of the heating period and reclosing of the compressor motor circuit is temperature controlled. Further than this, it is to be noted that a very small number of parts are required in these constructions as disclosed hereinabove.

The devices are simple, reliable and may be cheaply and easily produced.

Although the invention has been described in considerable detail, this description is intended as illustrative rather than limiting as the invention is to be limited only as claimed.

We claim:
1. An electric switch comprising a cam contoured to provide a shoulder, a plurality of switch arms including a first switch arm and a second switch arm and a third switch arm mounted between said first and second switch arms and adapted to alternately engage one or the other of said switch arms, said third switch arm normally contacting said first switch arm, a synchronous motor including driving means for driving said cam for a selected period of time, said first switch arm being arranged to ride on said cam during said driving period, said shoulder of said cam being operative when driven to hold said third switch arm out of contact temporarily with said first switch arm and in contact with second switch arm, thermal element means including a bimetal member having a fixed end and a movable end and means carried by the movable end of said bimetal member temporarily connecting said movable end with said cam when a predetermined temperature is reached, said thermal means being operative to override said synchronous motor drive and rotate said cam and release said third switch arm for reengagement with said first switch arm.

2. The invention defined in claim 1 including lost motion means interposed between said synchronous driving means and said cam and operative to disengage said synchronous motor driving means from said cam to allow said movable end of said bimetal member to independently advance said cam when said predetermined temperature is reached.

References Cited in the file of this patent
UNITED STATES PATENTS

| | | |
|---|---|---|
| 2,114,512 | Weschcke | Apr. 19, 1938 |
| 2,203,719 | Crane | June 11, 1940 |
| 2,487,154 | Lloyd | Apr. 10, 1946 |
| 2,562,481 | Swayze | Dec. 22, 1947 |
| 2,674,665 | Raney et al. | Apr. 6, 1954 |
| 2,690,526 | Morrison | Sept. 28, 1954 |
| 2,705,048 | Wiley | Nov. 15, 1955 |
| 2,847,525 | Everard | Nov. 12, 1956 |